US010839297B1

(12) United States Patent
Ezick et al.

(10) Patent No.: US 10,839,297 B1
(45) Date of Patent: Nov. 17, 2020

(54) SYSTEM AND METHOD FOR CONFIGURATION OF AN ENSEMBLE SOLVER

(71) Applicant: Reservoir Labs, Inc., New York, NY (US)

(72) Inventors: James Ezick, Canonsburg, PA (US); Jonathan Springer, Carbondale, IL (US); Nicolas T. Vasilache, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 432 days.

(21) Appl. No.: 15/617,602

(22) Filed: Jun. 8, 2017

Related U.S. Application Data

(62) Division of application No. 13/910,467, filed on Jun. 5, 2013, now Pat. No. 9,684,865.

(60) Provisional application No. 61/655,965, filed on Jun. 5, 2012.

(51) Int. Cl.
*G06N 5/02* (2006.01)
*G06N 20/00* (2019.01)

(52) U.S. Cl.
CPC ............... *G06N 5/02* (2013.01); *G06N 20/00* (2019.01)

(58) Field of Classification Search
None
See application file for complete search history.

(56) References Cited

U.S. PATENT DOCUMENTS

2007/0112723 A1* 5/2007 Alvarez .................... G06F 9/50

OTHER PUBLICATIONS

Xu et al., Hydra: Automatically Configuring Algorithms for Portfolio-Based Selection, Jul. 2010, Twenty-Fourth AAAI Conference on Artificial Intelligence, pp. 210-216 (Year: 2010).*
Xiaoqin et al., An Ensemble Architecture for Learning Complex Problem-Solving Techniques from Demonstration, Sep. 2012, ACM Transactions on Intelligent Systems and Technology, vol. 3, No. 4, Article 75, pp. 75:1-75:38 (Year: 2012).*

* cited by examiner

*Primary Examiner* — Alan Chen
(74) *Attorney, Agent, or Firm* — Goodwin Procter LLP (57) ABSTRACT

In a system for enabling configuration of an ensemble of several solvers, such that the ensemble can efficiently solve a constraint problem, for each one of several candidate configurations, an array of scores is computed. The array corresponds to a statistical parameter related to a problem solution, and the computation is based on, at least in part, a set of features associated with the problem. One candidate configuration is assigned to a solver, and based on the array of scores associated with that candidate configuration the same or a different candidate configuration is assigned to a another solver. A system for dynamically reconfiguring an ensemble of solvers obtains runtime data from several solvers, and a new configuration is determined by applying a machine learning and/or heuristic analysis procedure to the runtime data. The configuration of a solver may be updated according to the new configuration while that solver is running.

33 Claims, 2 Drawing Sheets

SYSTEM AND METHOD FOR CONFIGURATION OF AN ENSEMBLE SOLVER

CROSS REFERENCE TO RELATED APPLICATIONS

This application is a division of and claims the benefit of and priority to U.S. patent application Ser. No. 13/910,467, titled "System and Method for Configuration of an Ensemble Solver," filed on Jun. 5, 2013, which claims the benefit of priority to U.S. Provisional Patent Application Ser. No. 61/655,965, titled Method of Using Machine Learning to Drive Adaptive Ensemble Configuration in a Constraint Solver," filed on Jun. 5, 2012, the entirety of each of which is incorporated herein by reference.

GOVERNMENT INTERESTS

Portions of this invention were made with U.S. Government support under contract no. W9113M-10-C-0089 awarded by the Missile Defense Agency (MDA), and under contract no. W91CRB-11-C-0087 awarded by the Defense Advanced Research Projects Agency (DARPA). The U.S. Government has certain rights in the invention.

FIELD OF THE INVENTION

The present invention generally concerns mathematical solvers. More particularly, the present invention concerns a system and method for configuring an ensemble of solvers so as to efficiently solve and/or determine solvability of a constraint problem.

BACKGROUND OF THE INVENTION

A constraint solver is generally understood as a process, or a processor adapted to execute a process, that accepts as input a system of constraints including one or more constraints over one or more variables, and returns an assignment of values to those variables, if one exists, such that all of the constraints are satisfied. If no such assignment of variables exists, the process determines that the constraint system is unsatisfiable, i.e., the process determines that there is no set of values that can be assigned to the variables such that all constraints are satisfied. In general, "solving" a constraint problem includes either determining whether a constraint-satisfying assignment exists, or finding such an assignment, or both.

The set of possible assignments, i.e., the several combinations of values that can be assigned to the constraint system variables, generally describes a search space over which the constraint solver process/algorithm executes. If the number of constraint variables and/or the number of constraints in the constraint system are large, the theoretical search space, i.e., the set of each and every combination of values that can be assigned to all the variables, can become very large. Such a constraint problem may be intractable, i.e., even a large computer or a number solvers operating together may not be able to solve the problem in a reasonable time (e.g., minutes, hours, or even days), and/or may run out of memory while solving the problem.

A typical constraint solver includes several adjustable parameters. Generally, one or more of these parameters can be tuned or adjusted to affect the manner (e.g., order) in which the solver/algorithm searches the space of possible assignments. Thus, by appropriately selecting the parameter values, the overall search space can be explored efficiently in order to find a solution. A choice of values for the parameters of a solver is commonly referred to as a configuration for the constraint solver.

An ensemble of constraint solvers includes several constraint-solver instances (nodes), running concurrently, attempting to find a satisfying assignment to a specified system of constraints. All of the constraint solvers in the ensemble may terminate once any of the solvers either finds a satisfying assignment to the variables of the constraint system or determines that the constraint problem is unsatisfiable. The coordinated start and termination of the ensemble solvers can be handled by a designated master process. An ensemble can include as few as two solvers, but typically includes a large number of solvers, e.g., 100 or 1000 solvers.

Generally, the solvers in the ensemble are either different algorithms accepting the same input, or differently configured versions of the same algorithm. The individual constraint solvers that form an ensemble may or may not share information with each other, e.g., about an area of the search space that a solver has already explored. Whether or not such information is shared, if different solvers simultaneously search different areas of the overall search space corresponding to a problem to be solved, an ensemble can operate faster than a single constraint solver configured to solved that problem. The different solvers can be adapted by assigning different configurations thereto such that one or more corresponding parameters of different solvers are assigned different values. The solvers thus configured can search different areas of the overall search space in different orders so that at least one of the solvers may explore the area that includes a solution to the problem relatively early. Thus the ensemble may find the solution faster than a single solver. This performance benefit can diminish, however, if one or more solvers initially explore search areas in which the solution is unlikely to be found or if several solvers explore the search space in substantially the same manner. As such, some techniques that can be used to configure only a single solver are not useful in configuring an ensemble of solvers such that the overall search space can be explored in an efficient manner.

Therefore, there is a need for a system and/or method that can configure a number of solvers in an ensemble according to a constraint problem to be solved. There is also a need to be able to readjust the configurations for one or more solvers in the ensemble as the solvers attempt to find the solution, such that the likelihood of finding a solution may be increased and/or the time required to find the solution may be decreased.

SUMMARY OF THE INVENTION

Various embodiments of the present invention enable configuration of an ensemble such that the several solvers in the ensemble can efficiently explore the search space corresponding to a constraint problem to be solved. Specifically, various embodiments can be used to configure different solvers in such a manner that the different solvers can simultaneously explore different areas of the overall search space while minimizing the risk that one or more solvers searches for a solution to the constraint problem in an area in which the solution is not likely to be found. This is achieved, in part, by generating a number of distinct candidate configurations that may be assigned to one or more solvers, and by computing an array of scores for each candidate configuration. Each array of configuration scores is based on arrays of scores assigned to the options assigned to the parameters of each candidate configuration.

Based on, at least in part, a comparison of the arrays of configuration scores, a determination is made whether to assign a certain candidate configuration to any solver. In some cases, a certain candidate configuration may be assigned to more than one solver. The difference in the configuration scores of two candidate configurations indicates that solvers configured according to those two candidates are likely to search different areas of the overall search space. The score value can be indicative of a relative probability that a solver according to a certain candidate configuration can find a solution in a specified amount of time. Thus, the assignment of candidate configurations based on, at least in part, the arrays of scores can increase the likelihood that different areas of the overall search space are explored while mitigating the risk of searching areas in which a solution is not likely to be found. This can maximize the efficiency of solving the constraint problem using an ensemble.

Various embodiments also facilitate changing the configuration of one or more solver nodes within an ensemble after the solution process has started in response to information derived from the solution process. This can further increase the efficiency of exploring the search space in finding a solution. The various embodiments of the ensemble configuration system and method described herein can be used to configure ensembles used for solving many different types of problems such as resource allocation, planning, graph analytics, hardware and software verification, etc.

Accordingly, in one aspect, various embodiments feature an article of manufacture that includes instructions to configure a processor, a method, and/or a system that enables configuration of an ensemble of several solvers such that the ensemble can efficiently explore the search space corresponding to a constraint problem. The system includes a memory, and a processor in electronic communication with the memory. The processor is configured according to the system configuration, or by the instructions included in the article of manufacture. The method and the processor as configured compute, for each candidate configuration within a number of candidate configurations, an array of aggregate scores. The array corresponds to a statistical parameter corresponding to a solution to a problem to be solved. The computation is based on, at least in part, a first set of features stored in memory, and the first set of features is associated with the problem to be solved by the ensemble. The method and the processor as configured assign to a first solver among the several solvers of the ensemble a first candidate configuration selected from the various candidate configurations. The assignment is based on, at least in part, the computed arrays of aggregate scores.

To compute the array of aggregate scores the method and the processor as configured may further apply a machine learning (ML) procedure to the first set of features. In some embodiments, the method and the processor as configured further assign to a second solver among the several solvers of the ensemble a second candidate configuration that is also selected from the number of candidate configurations. The selection of the second candidate configuration may be based on, at least in part, the computed arrays of aggregate scores. The second candidate configuration may be the same as the first candidate configuration. In other words, two solvers in the ensemble may have the same configuration.

In some embodiments, the method and the processor as configured further select a set of candidate configurations from the several candidate configurations based on, at least in part, the computed arrays of aggregate scores. The selected set of candidate configurations may include the first candidate configuration and the second candidate configuration. Configurations for other solvers in the ensemble may be selected from this set as opposed to selecting them from all of the candidate configurations.

In some embodiments, each candidate configuration includes a set of configuration parameters. A value for each configuration parameter can be selected from one or more options. For each candidate configuration, to compute an aggregate score in the array of aggregate scores, the method and the processor as configured further assign an option score to each configuration parameter based on, at least in part, an option value designated to the configuration parameter. Computation of the aggregate score may include a linear summation, which can be weighted or unweighted, of the option scores assigned to the configuration parameters. For each element in the array of aggregate scores, the option scores from the corresponding elements in the arrays of option scores are used in this computation.

The method and the processor as configured may generate the several candidate configurations from which configurations are selected and assigned to the various solvers of the ensemble. To this end, the method and the processor as configured further designate a first option to a first configuration parameter of the first candidate configuration, and designate a second option to the first configuration parameter of another candidate configuration. In general, the method and the configured processor may create a copy of a configuration in which all parameters are initially unassigned. Then, the method/configured processor may select an option value for each parameter. If the combination of the option values assigned is unique, a new configuration is created. A new configuration can also be created by copying an existing configuration and changing the option values of one or more parameters such that the combination of the modified options values is unique.

A configuration parameter from the set of configuration parameters can be a restart frequency, a decision heuristic, a use of conflict clause minimization, a number of conflict clauses to generate from each conflict, use of database compaction, a decay rate for a decision heuristic score, a frequency of sharing information between two solvers of the ensemble, selection indicative of information to be shared between the two solvers, or size of information to be shared between two solvers. A configuration parameter can also be a combination parameter that includes a combination of two or more of the above described parameters.

In some embodiments, the array of aggregate scores computed for the first candidate configuration includes a first aggregate score and a second aggregate score. The second aggregate score may be based on, at least in part, a distribution range associated with the statistical parameter that is associated with the problem to be solved. For example, the distribution range may be a range of expected times to solve the problem. The second aggregate score may represent a beneficial value of assigning a copy of the first candidate configuration to a solver in the ensemble. As such, the method and the processor as configured may further assign to a second solver, among the several solvers of the ensemble, the first candidate configuration based on, at least in part, the second aggregate score in the array of scores.

In some embodiments, the various solvers in the ensemble include a number of Boolean satisfiability solvers, and the processor and the processor as configured further assign to the first and second solvers first and second seeds, respectively. The second seed can be different than the first seed. The configuration of the solvers assigned to the first and second solvers may be the same. Alternatively, the method and the processor as configured may further assign to a second solver among the number of solvers of the ensemble a second candidate configuration that is both: (i) different than the first candidate configuration, and (ii) selected from the several of candidate configurations. The second candidate configuration is selected based on, at least in part, the second aggregate score in the array of scores computed for the first candidate configuration. In this case, the second aggregate score indicates that the benefit of copying the first candidate configuration is not as great as using a different, second configuration.

In some embodiments, to compute the array of aggregate scores the method and the processor as configured analyze: (i) the several candidate solver configurations, (ii) a second set of features, (iii) training data associating the several candidate solver configurations and the second set of features, and (iv) the first set of features. The training data correspond to a solution by the ensemble using the several candidate configurations, to a different problem than the problem to be solved. That problem is characterized by the second set of features. Using the training data and the first set of features, the aggregated scores for various candidate configurations, if used to solve the problem to be solved, can be computed. The problem to be solved may include a constraint satisfaction problem.

In some embodiments, the method and the processor as configured further statically derive the first set of features associated with the problem to be solved. These features are based on the problem to be solved. The statistical parameter related to the problem to be solved may include an expected time required to find the solution to the problem.

In some embodiments, the method and the processor as configured further receive in memory runtime data associated with the set of configurations assigned to the ensemble. The runtime data are received from at least a subset of solvers in the ensemble. The method and the processor as configured further apply a heuristic analysis procedure and/or another machine learning procedure to the runtime data, so as to update an aggregate score in an array of aggregate scores associated with the first candidate configuration that is assigned to the first solver. The method and the processor as configured may further update, based on the updated aggregate score, a score for an option designated to a configuration parameter of the first candidate configuration. The method and the processor as configured may also update, based on the updated score of the option, an option score for another candidate configuration in which a corresponding configuration parameter is also designated the option designated to the configuration parameter of the first candidate configuration. Moreover, the method and the processor as configured may update an aggregate score for the other candidate configuration based on, at least in part, the updated option score for the other candidate configuration. Thus, based on the runtime data the option score for a certain option value may be updated. Then, for any candidate configuration in which a corresponding parameter is assigned that option value, the corresponding options scores and the aggregate scores may also be updated, to reflect the information learned from the runtime data.

In another aspect, various embodiments feature an article of manufacture that includes instructions to configure a processor, a method, and/or a system that enables configuration of an ensemble of several solvers such that the ensemble can efficiently explore the search space corresponding to a constraint problem. The system includes a memory, and a processor in electronic communication with the memory. The processor is configured according to the system configuration, or by the instructions included in the article of manufacture. The method and the processor as configured receive from at least a subset of solvers in the ensemble runtime data associated with a first set of configurations currently assigned to the solvers in the ensemble. A machine learning procedure and/or a heuristic analysis procedure is applied to the runtime data to determine a new configuration to be assigned to a first solver in the ensemble. The new configuration is different than a configuration in the first set that is currently assigned to the first solver. The method and the processor as configured assign the new configuration to the first solver. In other words, the current configuration assigned to at least one of the solvers in the ensemble is updated based on the runtime data.

To assign the new configuration, the method and the processor as configured may adjust a configuration parameter of the first solver according to the new configuration without stopping the first solver. Alternatively, to assign the new configuration, the method and the processor as configured may stop the first solver, change a configuration parameter of the first solver according to the new configuration after stopping the first solver, and then restart the first solver.

In some embodiments, the method and the processor as configured further identify based on, at least in part, the runtime data a second solver in the ensemble performing at least at a preselected threshold. The configuration assigned to the second solver may be assigned to one or more other solvers in the ensemble. Thus, to determine the new configuration the method and the processor as configured may adjust a parameter of the new configuration according to a corresponding parameter of a configuration, from the first set, that is currently assigned to the second solver.

In some embodiments, the several solvers in the ensemble include a number of Boolean satisfiability solvers. The method and the processor as configured further associate a new seed with the first solver to which the new configuration is assigned. To determine the new configuration, the method and the processor as configured may copy each parameter of the new configuration from a corresponding parameter of a configuration, from the first set, that is currently assigned to the second solver. Thus, the first and second solvers may be assigned the same configuration but different seeds. In some embodiments, the method and the processor as configured further identify based on, at least in part, the runtime data a third solver in the ensemble performing below a preselected threshold. The third solver is designated as the first solver that is to be assigned the new configuration. Thus, configuration of a solver performing below a selected threshold can be updated.

The runtime data may include one or more of a depth of a solver decision stack, a duration for which the decision stack is at a specified depth, an average number of implications per decision, an implication fan out degree for a variable, an average length of an implication sequence, a maximum length of an implication sequence, and an average size of conflict clauses. At least one parameter of the new configuration may be a restart frequency, a decision heuristic, a use of conflict clause minimization, a number of conflict clauses to generate from each conflict, use of database compaction, a decay rate for a decision heuristic score, a frequency of sharing information between two solvers of the ensemble, selection indicative of information to be shared between the two solvers, or size of information to be shared between two solvers. A parameter of the new configuration may also include a combination of two or more of the above listed individual parameters.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Figure 1:
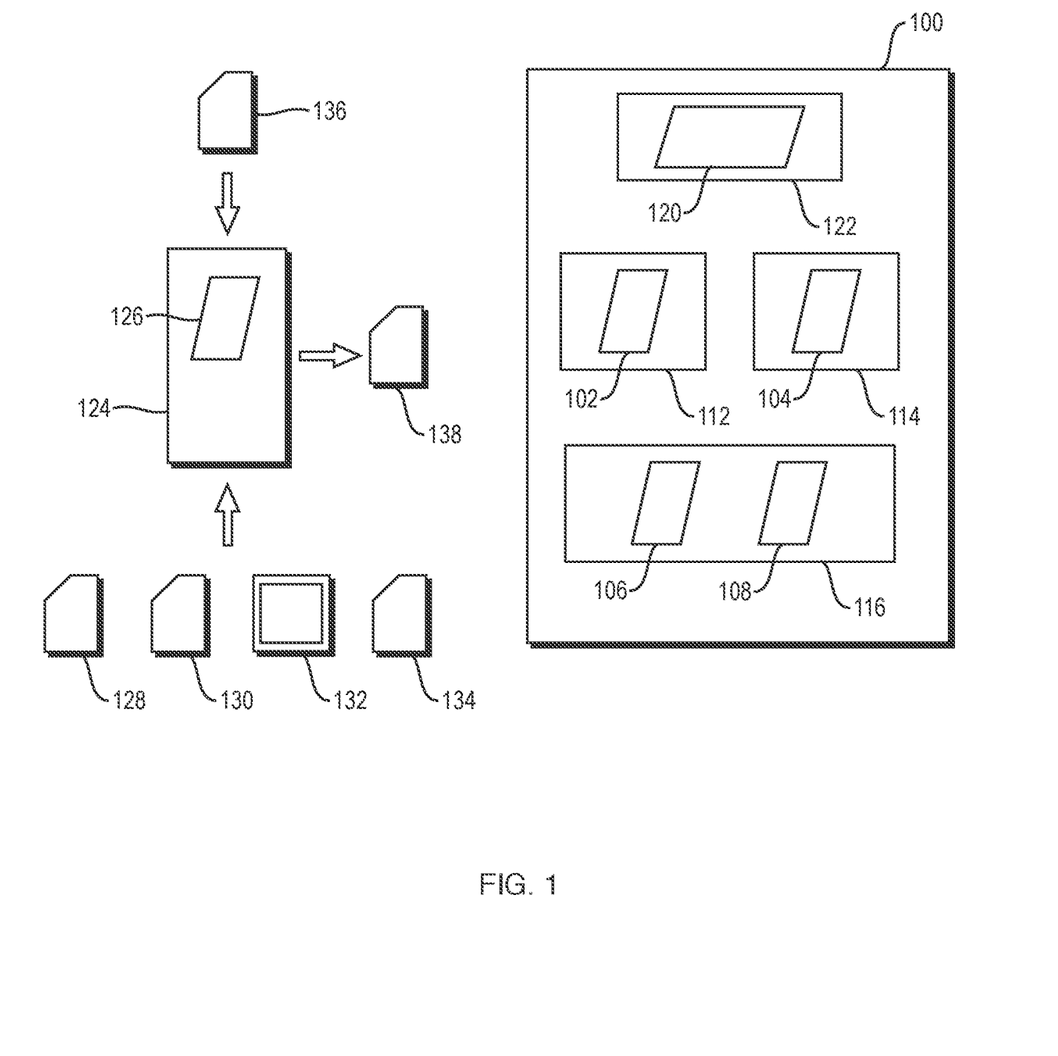
FIG. 1 depicts an ensemble to be configured, and an ensemble configuration system, according to one embodiment.

With reference to FIG. 1, an ensemble 100 includes solvers 102, 104, 106, 108 and a master process 120. It should be understood that the number of solvers is illustrative only and that an ensemble may include as few as two and as many has tens, hundreds, or thousands of solvers. Some ensembles may not include a master process. A processor 112 is adapted to function as the solver 102 and a processor 114 is adapted to function as the solver 104. A multi-processor computer 116 is adapted to function as two individual solvers, namely, the solvers 106, 108. In some embodiments, each solver is implemented or provided by a distinct processor, while in other embodiments, one computer (e.g., a single processor, a multi-processor system, a server, etc.) is adapted to provide the functionalities of two or more individual solvers.

In the ensemble 100, each of the solvers 102-108 can communicate information about the solver's run, i.e., information about the solver's attempt to solve the constraint problem up to a certain time, with a master process 120 which is implemented by a processor 122. The master process 120 can process and share the information received from one solver (e.g., the solver 102) with the other solvers (e.g., the solvers 104-108). In some embodiments, a master process may share the received information with only some of the solvers in the ensemble, and in some embodiments the master process may not share the information with any solver. Instead, the received information may be used to select configurations of one of more solvers.

FIG. 1 also depicts a processor 124 that is adapted to execute an ensemble configuration process 126 that assigns configurations to the solvers 102-108. The process 126 can receive information about the constraint problem to be solved 128, a previously solved constraint problem 130, such as a training problem, an ensemble configuration 132, i.e., configurations of the solvers 102-108 used to solve the problem 130, and runtime data 134 obtained while solving the problem 130 (e.g., training data). The ensemble configuration process 126 can optionally receive additional runtime data 136 as the ensemble 100 attempts to solve the current problem 128. These runtime data may be obtained from the master process 120 and/or directly from one or more individual solvers 102-108. In some embodiments, a processor used to implement one or more of the individual solvers can also implement the master process 120, the ensemble configuration process 126, or both.

The ensemble configuration process 126 can extract observable characteristics or features 138 of the problem to be solved and may use the extracted features in determining candidate configurations and scores associated therewith. Various machine learning (ML) algorithms that can determine candidate configurations and/or scores based on the extracted features may be incorporated into the process 126. In particular, using a machine learning algorithm the process can compute the arrays of scores according to a statistical parameter associated with the problem to be solved. For example, the ML algorithm can assign scores to an option and/or a candidate configuration based on the expected time to solve the problem.

Figure 2:
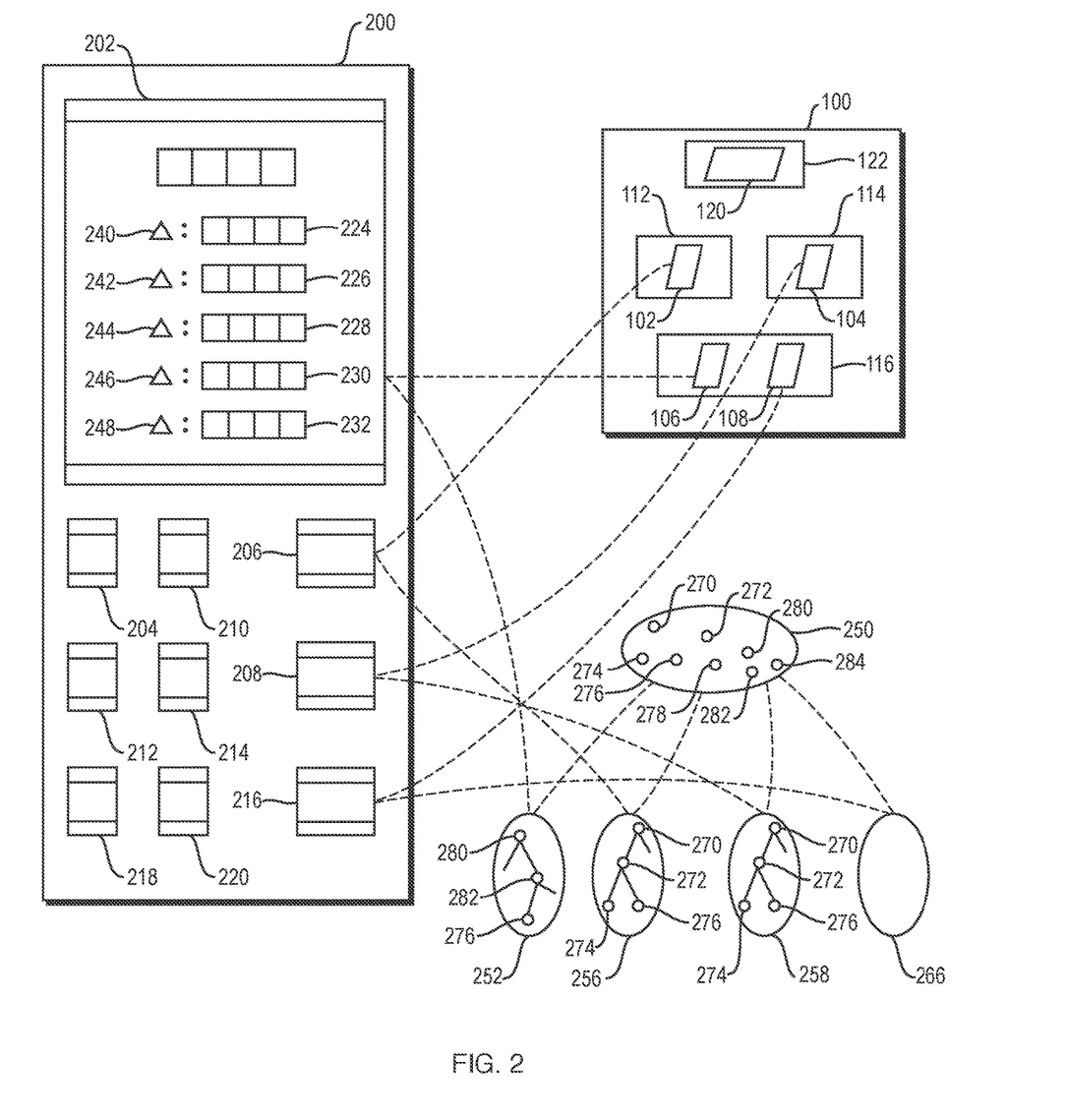
FIG. 2 schematically illustrates candidate configurations, a search space corresponding to a problem to be solved an exemplary mapping of candidate configurations to solvers of an ensemble, according to one embodiment.

FIG. 2 schematically depicts a set 200 of ten candidate configurations, i.e., candidate configurations 202 through 220, that are considered by the ensemble configuration process 126. An ensemble configuration process, in general, may generate and consider as few as two and as many as tens, hundreds, or thousands of candidate configurations. Each candidate configuration includes an array of aggregate scores, and arrays of option scores. An array of option scores may be associated with a parameter of the candidate configuration. In the embodiment illustrated with reference to FIG. 2, each of the candidate configurations 202-220 includes five parameters. Each parameter can be assigned a value selected from one or more options. In general a candidate configuration may include fewer or more parameters than can be adjusted, and the number of options available for different parameters can be different.

For the sake of clarity, FIG. 2 depicts the arrays scores associated with only the candidate configuration 202, though such arrays are associated with the other candidate configurations 204-220 as well. Specifically, an array 222 includes four elements, and each element holds an aggregate score associated with the candidate configuration 202. In general, there may be as many elements in each array as the number of solvers in the ensemble. Option score arrays 224 through 232 respectively correspond to the choice of an option for each of the parameters 240 through 248 of the candidate configuration 202. Each option score array also includes four elements because the exemplary ensemble 100 includes four solvers.

A solver configured according to a certain configuration may explore various areas of the overall search space 250 corresponding to the problem to be solved in a specific order, as determined by the solver's configuration. In one embodiment, Configuration 3, 206, is assigned to solver 102; Configuration 4, 208, is assigned to solver 104; Configuration 1, 202, is assigned to solver 106; and Configuration 8, 216, is assigned to solver 108. Accordingly, the solver 102 may explore the search space 250 in Order 3, 256, while the solver 104 may explore the space 250 in Order 4, 258. The solvers 106, 108 may explore the space 250 in Order 1, 252, and Order 8, 266, respectively. A selection of the search order may include a selection of an order in which the constraint variables are assigned values during exploration and/or an order of different values that may be assigned to those variables. The configurations may be selected such that the different orders of areas searched by the solvers are non-overlapping or are partially overlapping. The search orders according to the assigned or candidate configurations may cover the entire search space.

With reference to FIG. 2, the search orders 256, 258 are similar to each other in that the solvers 102, 104 may apply similar methods to explore solutions to the problem, e.g., by making the same non-random decisions. To illustrate, both solvers 102, 104 start by exploring search area 270 and then explore search area 272. Thereafter, however, the solver 102 explores the area 274 while the solver 104 explores the area 276. The solver 102 may subsequently search the area 276 and the solver 104 may later search the area 274. The search order 252 is significantly different from the search orders 256, 258, and as such, the solver 106 is likely to initially explore solutions that are substantially dissimilar to those initially explored by the solvers 102, 104. For example, the solver 106 may start with search area 280, then proceed to search area 282 before exploring the search area 276 that may be explored by the solves 102, 104. The solver 108 may explore the search space 250 in yet another order 266.

The ensemble configuration processes determines the scores in the arrays of scores, and these scores are indicative of relative costs (e.g., computation costs) and benefits of exploring the overall search space in a particular order. In some cases, the constraint solver includes a random seed that also affects the order in which the search space is explored. The array of scores associated with a configuration are indicative of the benefit of mapping multiple copies of a configuration, with different random seeds, to different solvers in the ensemble. Intuitively, the score in array index i indicates the benefit associated with the i-th copy of the configuration. The greater the learned expected variability in the performance of the configuration, the slower the benefit scores tend to decrease across the array. Therefore, an assignment of configurations based on the arrays of scores can result in an ensemble configuration that can simultaneously search different areas/portions of the search space if a solution is likely to be found in any of those areas, while initially avoiding the areas in which a solution is not likely to be found. These areas may be searched, but after the areas that are likely to include a solution. The ensemble so configured can solve the problem faster than a single solver. Thus, selecting various search orders based on the computed arrays of scores can unlock the potential benefit of using an ensemble to solve the constraint problem faster than using a single solver.

Ensemble Configuration Selection

Given an ensemble of solvers, S1 . . . Sn, the goal is to assign to each solver a configuration. In one embodiment, each solver has a set of parameters, P1 . . . Pm. Each parameter can be assigned a choice of value from among one or more options. For each parameter, the set of options is a finite set, although the number of options may vary for each parameter. The number of options for different parameters can be the same, or can be different for different parameters. A configuration is a set that assigns to each parameter of the solver exactly one option from the set of options associated with that parameter. An ensemble configuration is then the assignment of a configuration to each solver in the ensemble. In one embodiment, a single configuration may be assigned to more than solver in an ensemble. The parameters of a solver include but are not limited to a restart frequency, a decision heuristic, a use of conflict clause minimization, a number of conflict clauses to generate from each conflict, use of database compaction, a decay rate for a decision heuristic score, a frequency of sharing information between two solvers of the ensemble, selection indicative of information to be shared between the two solvers, and size of information to be shared between two solvers.

Configuration of an Entire Ensemble

The process assigning an entire ensemble works by assigning an array of scores to each option. A score is a real value (positive, negative, or zero). The length of the array of scores is equal to the number of solvers in the ensemble. The array of scores for each option is derived from the feature set of the problem being solved (that is, the score arrays vary from problem to problem). From these score arrays, the array of scores for a configuration is the linearly weighed (element-wise) sum of the array score for the options assigned to the parameters that comprise the configuration.

EXAMPLE

Consider an ensemble of two solvers: S1, S2. Each solver configuration includes two adjustable parameters. Parameter 1 is restart frequency, and the options for Parameter 1 are 100, 500, 1000. The corresponding option scores for Parameter 1 are as follows:

100: [50 40]
500: [70 60]
1000: [100 80]

The second parameter, Parameter 2, is use conflict clause minimization, and the options for Parameter 2 are true and false, indicating whether conflict clause minimization is employed by the solver. The option scores for Parameter 2 are:

true: [40 20]
false: [60 10]

Based on these parameters and options, an exemplary candidate configuration can be described as {Parameter 1=500, Parameter 2=false} or as {500, false}. The aggregate score for this candidate configuration is given by:

A1*[70 60]+A2*[60 10]

where A1 and A2 are tuning coefficients or weights associated with Parameter 1 and Parameter 2, respectively. Without the loss of generality, if A1=A2=1, the aggregate score for the candidate configuration {500, false} is [130 70].

In this example, there are six possible candidate configurations, each with a corresponding array of scores as shown below.

C1: {100, true}=[90 60]
C2: {100, false}=[110 50]
C3: {500, true}=[110 80]
C4: {500, false}=[130 70]
C5: {1000, true}=[140 100]
C6: {1000, false}=[160 90]

Given the score array for each possible candidate configuration, C1 . . . Ck, the ensemble selection process proceeds as follows. Without the loss of generality, assume score arrays are indexed from 1.

Initially, let Ci_index=1 for each configuration (i=1 . . . k)

Let Score[Ci]=the score for configuration Ci at array index Ci_index. For each solver, Sj, (j=1 . . . n), assign to Sj the configuration Ci with the highest value of Score[Ci] and then increment Ci_index for that configuration. Intuitively, the array index captures the value or benefit of assigning multiple copies of a certain configuration to different solvers in the ensemble. For example, solver S1 would be assigned the configuration C6 because initially, when Ci_index=1 for all i, the first element of the array of aggregate scores associated with the candidate configuration C6 is the maximum score. C6_index is then incremented to 2, while indices for the other candidate configurations remain at 1. Therefore, the solver S2 would be assigned the configuration C5, because C6_index is now 2, and C5[1]=140 is greater than C6[2], which is equal to 90. In general, this process assigns to each solver in the ensemble exactly one configuration.

In another embodiment, each solver configuration includes two adjustable parameters as in the Example above, but Parameter 1 is a combination parameter. Specifically, Parameter 1 is a combination of the individual parameters, namely, restart frequency and decision heuristic. It should be understood that this combination is illustrative only and that other combinations including additional individual parameters and combinations of two or more different parameters are contemplated in various embodiments. By combining two or more individual parameters into a single combination parameter, the ensemble configuration process can take into account any correlation that may exist between the individual parameters that are combined. The options associated with a combination parameter include tuples of options instead of individual options. Correspondingly, each element of the array of option scores associated with a combination parameter includes a single score related to the combined choice of the parameters in the tuple.

One method for assigning the score arrays to the options is to use a machine learning algorithm on a training set of problems and configurations. In one embodiment, the training data that associate a constraint problem instance, an ensemble configuration, and a time-to-solution are parsed. A machine learning method can use the parsed data to generate a quantitative ranking (e.g., based on lowest expected time-to-solution) of solver configurations for a specific, previously unseen, constraint problem instance, e.g., the problem to be solved. To this end, from an analysis of the training data, a model is constructed that maps the feature set of the problem being solved to an array of scores for each option. The ensemble configuration process may extract the feature set from a specification of the problem to be solved.

Dynamic Reconfiguration of an Ensemble

In one embodiment, as the solvers in the ensemble run, they communicate information back to the ensemble configuration process. That information can be used to adjust/update the array scores associated with options represented in the configuration from which the information was sent. Periodically, the arrays of scores in the candidate set of configurations may be adjusted according to the updated scores.

In general, information from a solver in the ensemble running with the configuration Ci may cause the aggregate configuration score for Ci to be changed (increased or decreased) by a quantity Delta. Based on this update, the option score arrays and the aggregate score arrays associated with different candidate configurations are updated as follows:

Let $A=A1+\ldots+Am$, where $A1, A2, \ldots, Am$ are the weights associated with each parameter of the configuration. In this example, m=2 as there are two parameters, and A=2 because A1=A2=1.

For each option, Oj (j=1 . . . m), assigned to a parameter in a candidate configuration Ci, multiply each score in array associated with Oj the quantity (Ci[1]+Delta*Ai/A)/Ci[1]. For example, if the ensemble configuration process receives information from a solver running the configuration C5={1000, true} that results in a change of Delta=+20 for that configuration, the new (updated) score arrays may be computed as follows:

$$\text{Parameter 1, Option } 1000 = [\,100 \quad 80\,] * ((100 + 20 * 1/2)/100$$
$$= [\,100 \quad 80\,] * 1.1 = [\,110 \quad 88\,]$$
$$\text{Parameter 2, Option True} = [\,40 \quad 20\,] * ((40 + 20 * 1/2)/40$$
$$= [\,40 \quad 20\,] * 1.25 = [\,50 \quad 25\,]$$

Periodically, the set of candidate configurations assigned to the ensemble is updated using the revised scores. The method for determining the updated configuration assignments is substantially the same as that described earlier. In one embodiment, the ensemble is adjusted by changing parameters while the solvers are running, without stopping, updating the parameters, and then restarting the solver, where possible. The solver includes a process of finding a solution, and that process can simply use the updated parameter value during subsequent processing by the updated solver. Specifically, a solver typically includes an iterative process in which each iteration corresponds to the exploration of a branch in the search space. Some configuration parameters (e.g., frequency of restarts) can be modified between iterations without causing a disruption in the execution state of the algorithm. Thus, a solver can be reconfigured/tuned dynamically as it is running. In some instances, the solver is stopped, the configuration thereof is updated, and then the solver is restarted with the newly selected configuration.

In the context of an ensemble, a single solver node can be retired (terminated) and replaced with a solver having a different configuration without affecting the function of the ensemble as a whole, e.g., while other solvers in the ensemble are running. This can be advantageous when, e.g., a particular solver is not making progress towards finding a solution and/or when another solver having a different configuration is making superior progress. Therefore, it may be deemed to be making a more valuable use of the available computing resources if the other solver is replicated, or solvers similar to the other solver are employed. To this end, an ensemble may include a communication network, and a master console process (e.g., the master process 120, discussed with reference to FIG. 1) may receive from and/or send to various solvers, information about the behavior and progress of the individual solvers. The master console process may use machine learning (ML) methods and/or heuristic methods to decide modifications to the configurations of one or more solvers in the ensemble. In one embodiment, the ensemble configuration process can parse the observable aspects of the solver run and then, using heuristics, make a determination as to which solvers should be restarted and/or updated. The configuration of an individual solver may be updated or replaced with a different configuration as described above (e.g., by re-computing the arrays of scores) dynamically, or by requiring a restart of the solver.

In one embodiment, the method for mapping information from a running solver configuration to a Delta is based on a heuristic that references the model used to originally assign arrays of scores to options, i.e., based on the features of the problem to solver, and optionally based on training data and the corresponding solver configurations. The data received from one or more solvers, as they attempt to solve a problem, include but are not limited to a depth of a solver decision stack, a duration for which the decision stack is at a specified depth, an average number of implications per decision, an implication fan out degree for a variable, an average length of an implication sequence, a maximum length of an implication sequence, and an average size of conflict clauses. These data can be communicated to a master process and/or the ensemble configuration process on demand or periodically (e.g., after a fixed number of iterations of the iterative solver process). As described above, these data can be processed by a machine learning algorithm and/or a heuristic algorithm to compute the adjustment Delta.

In one embodiment, an ensemble constraint solver R-Solve is designed to run on message passing interface (MPI)-connected clusters. When executing on a cluster of interconnected processors, the constraint system to solved is replicated on each processor, and each processor runs an independent instantiation of the R-Solve constraint solving algorithm/process. R-Solve accepts as a constraint system Boolean logical formulas (and, or, and not expressions). The variables of the formula are Boolean variables, each accepting as a value either true or false. The constraint system for the Boolean satisfiability problem (also known as SAT) is that the logical formula must evaluate to true value. An R-Solve ensemble includes multiple instances of the R-Solve SAT constraint solving algorithm, each operating with a different collection of settings according to a set of tunable parameters (i.e., configuration). In R-Solve, the solver instances in the ensemble are able to communicate learned conflict clauses. These conflict clauses can be taken as summaries of areas of the search space which it has been determined do not contain a satisfying assignment. This communication is performed via broadcast from the source node to all other nodes in the ensemble.

In addition to the tunable parameters, a random seed is also associated with an instance of R-Solve. Even if the configuration of two instances of R-Solve are identical, if their random seeds have different values, the two instances can explore the search space in a different manner, and may explore similar but distinct solutions. The random seed has a special role in the R-Solve SAT solver. Modulo the random seed, the anticipated performance of a configuration can be defined as a probability space. The choice of random seed, in essence, selects a run of the solver from this space. In selecting configurations for an ensemble, there is a tradeoff between selecting twice from the same probability space (same configuration, different random seed) versus selecting two distinct configurations (one selection from each of two probability spaces).

In one embodiment, the ensemble configuration process can parse the training data that associate a Boolean satisfiability constraint problem instance, an ensemble configuration, and a time-to-solution. A machine learning method can use the parsed data to generate a for a specific, previously unseen Boolean satisfiability problem instance, a probability distribution of expected time-to-solution over the space of random seeds for each of the configurations represented in the training set. As part of mapping the features of the Boolean satisfiability problem to be solved to a set of solver configurations, a heuristic algorithm may be used to select for the ensemble between two distinct configurations versus two configurations that are identical, but have different random seeds.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices.

Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method for dynamically assigning a configuration to a solver in an ensemble comprising a plurality of solvers collectively solving a specified problem, the method comprising:
   receiving from at least a subset of solvers in the ensemble runtime data associated with a first set of solver configurations that are currently assigned to the subset of solvers;
   applying by a processor at least one of a machine learning procedure and a heuristic analysis procedure to the runtime data to determine a new first solver configuration to be assigned to an already running first solver in the ensemble, the new first solver configuration being different from a current first solver configuration that is in the first set and that is currently assigned to the first solver, wherein the new first solver configuration adjusts a parameter of the first solver and changes a manner of searching an overall search space of the specified problem; and
   assigning the new configuration to the first solver.

2. The method of claim 1, wherein the parameter of the first solver is adjusted without stopping the first solver.

3. The method of claim 1, wherein assigning the new first solver configuration comprises:
   stopping the first solver;
   changing the parameter of the first solver according to the new first solver configuration after stopping the first solver; and
   restarting the first solver.

4. The method of claim 1, further comprising identifying based on, at least in part, the runtime data a second solver in the ensemble performing at least at a preselected threshold.

5. The method of claim 4, further comprising:
   determining a new second solver configuration, wherein determining the new second solver configuration comprises adjusting a parameter of the second solver according to a corresponding parameter of a current second solver configuration from the first set, wherein the current second solver configuration is currently assigned to the second solver.

6. The method of claim 4, wherein determining the new second solver configuration comprises copying each parameter of the new second solver configuration from a corresponding parameter of the current second solver configuration.

7. The method of claim 1, wherein the plurality of solvers in the ensemble comprises a plurality of Boolean satisfiability solvers, the method further comprising:
   associating a new seed with the first solver to which the new first solver configuration is assigned.

8. The method of claim 1, further comprising:
   identifying based on, at least in part, the runtime data a third solver in the ensemble performing below a preselected threshold; and
   designating the third solver as the first solver that is to be assigned the new first solver configuration.

9. The method of claim 1, wherein the runtime data comprises at least one of a depth of a solver decision stack, a duration for which the decision stack is at a specified depth, an average number of implications per decision, an implication fan out degree for a variable, an average length of an implication sequence, a maximum length of an implication sequence, and an average size of conflict clauses.

10. The method of claim 1, wherein the new first solver configuration comprises at least one parameter selected from the group consisting of a restart frequency, a decision heuristic, a use of conflict clause minimization, a number of conflict clauses to generate from each conflict, use of database compaction, a decay rate for a decision heuristic score, a frequency of sharing information between the first solver and an other solver of the ensemble, selection indicative of information to be shared between the first solver and the other solver, and size of information to be shared between the first solver and the other solver.

11. The method of claim 1, wherein the new first solver configuration comprises at least one parameter comprising a combination of at least two of a restart frequency, a decision heuristic, a use of conflict clause minimization, a number of conflict clauses to generate from each conflict, use of database compaction, a decay rate for a decision heuristic score, a frequency of sharing information between the first solver and an other solver of the ensemble, selection indicative of information to be shared between the first solver and the other solver, and size of information to be shared between the first solver and the other solver.

12. A system for assigning configurations to one or more solvers in an ensemble comprising a plurality of solvers collectively solving a specified problem, the system comprising:
   a memory; and
   a processor in electronic communication with the memory, wherein the processor is configured to:
   receive from at least a subset of solvers in the ensemble runtime data associated with a first set of solver configurations that are currently assigned to the subset of solvers;
   apply at least one of a machine learning procedure and a heuristic analysis procedure to the runtime data to determine a new first solver configuration to be assigned to an already running first solver in the ensemble, the new first solver configuration being different from a current first solver configuration that is in the first set and that is currently assigned to the first solver, wherein the new first solver configuration adjusts a parameter of the first solver and changes a manner of searching an overall search space of the specified problem; and assign the new configuration to the first solver.

13. The system of claim 12, wherein the processor is further configured to adjust the parameter of the first solver without stopping the first solver.

14. The system of claim 12, wherein to assign the new first solver configuration the processor is configured to:
stop the first solver;
change the parameter of the first solver according to the new first solver configuration after stopping the first solver; and
restart the first solver.

15. The system of claim 12, wherein the processor is further configured to identify based on, at least in part, the runtime data a second solver in the ensemble performing at least at a preselected threshold.

16. The system of claim 15, wherein the instructions are further programmed to:
determine a new second solver configuration, wherein to determine the new second solver configuration the processor is configured to adjust a parameter of the second solver according to a corresponding parameter of a current second solver configuration from the first set, wherein the current second solver configuration is currently assigned to the second solver.

17. The system of claim 15, wherein to determine the new second solver configuration the processor is configured to copy each parameter of the new second solver configuration from a corresponding parameter of the current second solver configuration.

18. The system of claim 12, wherein the plurality of solvers in the ensemble comprises a plurality of Boolean satisfiability solvers, and the processor is further configured to:
associate a new seed with the first solver to which the new first solver configuration is assigned.

19. The system of claim 12, wherein the processor is further configured to:
identify based on, at least in part, the runtime data a third solver in the ensemble performing below a preselected threshold; and
designate the third solver as the first solver that is to be assigned the new first solver configuration.

20. The system of claim 12, wherein the runtime data comprises at least one of a depth of a solver decision stack, a duration for which the decision stack is at a specified depth, an average number of implications per decision, an implication fan out degree for a variable, an average length of an implication sequence, a maximum length of an implication sequence, and an average size of conflict clauses.

21. The system of claim 12, wherein the new first solver configuration comprises at least one parameter selected from the group consisting of a restart frequency, a decision heuristic, a use of conflict clause minimization, a number of conflict clauses to generate from each conflict, use of database compaction, a decay rate for a decision heuristic score, a frequency of sharing information between the first solver and an other solver of the ensemble, selection indicative of information to be shared between the first solver and the other solver, and size of information to be shared between the first solver and the other solver.

22. The system of claim 12, the new first solver configuration comprises at least one parameter comprising a combination of at least two of a restart frequency, a decision heuristic, a use of conflict clause minimization, a number of conflict clauses to generate from each conflict, use of database compaction, a decay rate for a decision heuristic score, a frequency of sharing information between the first solver and an other solver of the ensemble, selection indicative of information to be shared between the first solver and the other solver, and size of information to be shared between the first solver and the other solver.

23. An article of manufacture, comprising a non-transitory machine-readable medium storing instructions that, when executed by a machine comprising a memory and a processor in electronic communication with the memory, configure the processor to:
receive from at least a subset of solvers in an ensemble of a plurality of solvers collectively solving a specified problem, runtime data associated with a first set of solver configurations that are currently assigned to the subset of solvers;
apply at least one of a machine learning procedure and a heuristic analysis procedure to the runtime data to determine a new first solver configuration to be assigned to an already running first solver in the ensemble, the new first solver configuration being different from a current first solver configuration that is in the first set and that is currently assigned to the first solver, wherein the new first solver configuration adjusts a parameter of the first solver and changes a manner of searching an overall search space of the specified problem; and
assign the new configuration to the first solver.

24. The article of manufacture of claim 23, wherein the instructions further configure the processor to adjust the parameter of the first solver without stopping the first solver.

25. The article of manufacture of claim 23, wherein to assign the new first solver configuration the instructions further configure the processor to:
stop the first solver;
change the parameter of the first solver according to the new first solver configuration after stopping the first solver; and
restart the first solver.

26. The article of manufacture of claim 23, wherein the instructions further configure the processor to identify based on, at least in part, the runtime data a second solver in the ensemble performing at least at a preselected threshold.

27. The article of manufacture of claim 26, wherein the instructions further configure the processor to:
determine a new second solver configuration, wherein to determine the new second solver configuration the instructions further configure the processor to adjust a parameter of the second solver according to a corresponding parameter of a current second solver configuration from the first set, wherein the current second solver configuration is currently assigned to the second solver.

28. The article of manufacture of claim 26, wherein to determine the new second solver configuration the instructions further configure the processor to copy each parameter of the new second solver configuration from a corresponding parameter of the current second solver configuration.

29. The article of manufacture of claim 23, wherein the plurality of solvers in the ensemble comprises a plurality of Boolean satisfiability solvers, and the instructions further configure the processor to:

associate a new seed with the first solver to which the new first solver configuration is assigned.

30. The article of manufacture of claim 23, wherein the instructions further configure the processor to:

identify based on, at least in part, the runtime data a third solver in the ensemble performing below a preselected threshold; and designate the third solver as the first solver that is to be assigned the new first solver configuration.

31. The article of manufacture of claim 23, wherein the runtime data comprises at least one of a depth of a solver decision stack, a duration for which the decision stack is at a specified depth, an average number of implications per decision, an implication fan out degree for a variable, an average length of an implication sequence, a maximum length of an implication sequence, and an average size of conflict clauses.

32. The article of manufacture of claim 23, wherein the new first solver configuration comprises at least one parameter selected from the group consisting of a restart frequency, a decision heuristic, a use of conflict clause minimization, a number of conflict clauses to generate from each conflict, use of database compaction, a decay rate for a decision heuristic score, a frequency of sharing information between the first solver and an other solver of the ensemble, selection indicative of information to be shared between the first solver and the other solver, and size of information to be shared between the first solver and the other solver.

33. The article of manufacture of claim 23, the new first solver configuration comprises at least one parameter comprising a combination of at least two of a restart frequency, a decision heuristic, a use of conflict clause minimization, a number of conflict clauses to generate from each conflict, use of database compaction, a decay rate for a decision heuristic score, a frequency of sharing information between the first solver and an other solver of the ensemble, selection indicative of information to be shared between the first solver and the other solver, and size of information to be shared between the first solver and the other solver.

* * * * *

UNITED STATES PATENT AND TRADEMARK OFFICE
CERTIFICATE OF CORRECTION

PATENT NO. : 10,839,297 B1
APPLICATION NO. : 15/617602
DATED : November 17, 2020
INVENTOR(S) : James Ezick et al.

Page 1 of 1

It is certified that error appears in the above-identified patent and that said Letters Patent is hereby corrected as shown below:

In the Specification

At Column 1, Line 20, under the heading "GOVERNMENT INTERESTS" Should read:
-- This invention was made with government support under Contract No. W9113M-10-C-0089 awarded by the U.S. Army Space & Missile Defense Command/ARSTRAT and Contract No. W91CRB-11-C-0087 awarded by the Army Contracting Command Aberdeen Proving Ground/DARPA. The government has certain rights in the invention. --

Signed and Sealed this
Fifth Day of July, 2022

Katherine Kelly Vidal
*Director of the United States Patent and Trademark Office*